Figure 1:
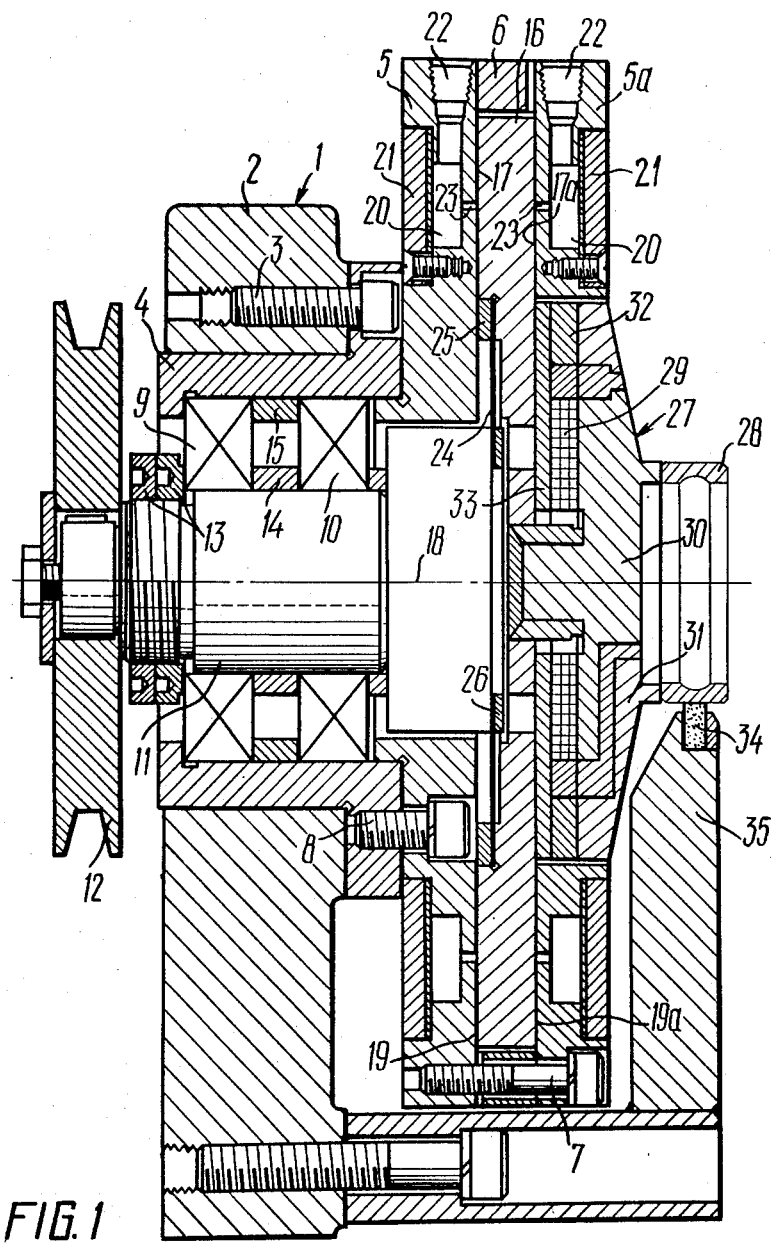

United States Patent [19]

Avrutin et al.

[11] 3,857,207
[45] Dec. 31, 1974

[54] DEVICE FOR SUPPORTING A WORKPIECE FOR ROTATION

[76] Inventors: July Davidovich Avrutin, Grazhdansky prospekt 83/2, kv. 67; Iosif Davydovich Gebel, Svetlanovsky prospekt 35, kv. 94; Askold Ivanovich Nefedov, 2 Nikitinskaya ulitsa 8, kv. 5, all of Leningrad; Solomon Abramovich Khilevich, ulitsa Tviryachaus 10, kv. 56, Vilnjus, all of U.S.S.R.

[22] Filed: Mar. 21, 1973

[21] Appl. No.: 343,408

[52] U.S. Cl. .................................. 51/237 R, 308/9
[51] Int. Cl. ............................................ B24b 41/04
[58] Field of Search ............... 51/165.9, 236, 237 R; 308/DIG. 1, 107, 122, 9

[56]   References Cited
UNITED STATES PATENTS

| | | | |
|---|---|---|---|
| 1,430,933 | 10/1922 | Brant et al. | 51/90 UX |
| 2,899,260 | 8/1959 | Farrand et al. | 308/DIG. 1 |
| 2,919,960 | 1/1960 | Whitney | 308/122 |
| 3,056,238 | 10/1962 | Hahn | 51/236 X |
| 3,082,009 | 3/1963 | Whitley et al. | 308/9 X |
| 3,466,951 | 9/1969 | Greenberg | 308/5 X |

Primary Examiner—Othell M. Simpson
Assistant Examiner—K. J. Ramsey
Attorney, Agent, or Firm—Waters, Roditi, Schwartz & Nissen

[57]   ABSTRACT

A device comprising a rotor having an end adapted to secure a workpiece. The rotor has opposing circular supporting surfaces which are flat, parallel and perpendicular to the axis of its rotation. Each of the supporting surfaces is connected to the corresponding supporting surface of the casing and is separated from the latter by a layer of working medium supplied under pressure. The rotor is connected to the drive by means of members whose stiffness in the axial direction is negligibly small as compared to the stiffness of the working medium layer, thus reducing to a minimum the effect produced by axial vibrations of the drive on the axial accuracy of the rotor rotation.

5 Claims, 2 Drawing Figures

DEVICE FOR SUPPORTING A WORKPIECE FOR ROTATION

The present invention relates to apparatus for supporting workpieces for rotation.

It is expedient to utilize the apparatus, constructed according to the present invention, for rotatively supporting workpieces having the form of rotation bodies, as well as machine components, mechanisms or instruments if they are to meet the requirements of minimizing the axial and end vibration or the angle precision of the geometrical axis of the element brought in rotation.

It is also expedient to employ the apparatus for supporting large-size workpieces for rotation.

Widely known are devices for supporting workpieces for rotation comprising a casing wherein a rotor (spindle) is installed on supports (bearings), the rotor being connected to the drive for rotating therewith. The rotor end is adapted to secure the workpiece, for which purpose it accommodates a magnetic cartridge or any other suitable appliance for supporting the workpiece.

In the prior art devices, the minimization of axial vibrations of the rotor in the course of its rotation is achieved by utilizing high-precision bearings spaced in the axial direction at a rather large distance from one another.

A disadvantage of the known devices for supporting workpieces for rotation is the relative complexity of fabricating high-precision bearings, as well as the support surfaces of the rotor and the casing which, in turn, makes the device more expensive, while the positioning of the bearings at a comparatively large distance from one another increases the size of the device in the axial direction. Apart from that, the bearings wear out in service comparatively quickly, thus increasing the axial vibrator of the rotor and, consequently, reducing the operational accuracy of the device.

The mentioned disadvantages become especially apparent with a rotating workpiece of considerable size, e.g., having a diameter of 0.3 m or more.

An object of the present invention is to provide a device wherein the rotor has minimal axial vibration.

Another object of the present invention is to provide a continuous accuracy of operation of the device, i.e., an increase in its service life.

Still another object of the invention is to provide a reduction in the labor required in fabricating the device and a lower cost.

A further object of the invention is to diminish the size of the device in the axial direction.

In accordance with the above and other objects a device is proposed for supporting a workpiece for rotation with a casing incorporating a rotor connected to the drive, the rotor end being adapted to secure said workpiece, wherein, according to the invention, the rotor has at least two opposing circular flat parallel surfaces which are perpendicular to the axis of rotation of the rotor and serve as its support surfaces for the installation in the casing, with the support surfaces of the casing being located so that each of them is adjacent to the appropriate support surface of the rotor and is separated from it by a layer of working medium supplied under pressure, the rotor being connected to the drive by means of members whose stiffness in the axial direction is so small that it can be neglected as compared to that of the working medium layer, thus reducing to a minimum the effects produced by the axial vibrations of the drive on the axial and end accuracy of the rotor rotation.

It is expedient to construct the rotor in the form of a flat disk whose opposing surfaces serve as support surfaces.

It is preferable to use such a rotor in devices for rotatively supporting workpieces whose radial dimensions are considerably smaller than the diameter of the rotor, as well as in devices with a relatively high speed of rotor rotation.

It is also expedient to construct the rotor in the form of two spaced apart and rigidly interconnected flat disks whose surfaces facing each other are parallel and serve as support surfaces.

Such a construction of the rotor makes it possible to use it in devices for supporting workpieces for rotation, the radial dimensions of the workpieces being close to the diameter of the rotor.

It is also expedient to construct the member for connecting the drive to the rotor in the form of a membrane.

Such a connection of the rotor to the drive is most simple in design and reliable in operation.

With relatively small axial loads imposed on the rotor, it is expedient to use compressed air as a working medium.

With increased axial loads imposed on the rotor, it is necessary to use a fluid as a working medium.

The device for rotatively supporting a workpiece, according to the present invention, makes it possible to reduce to a minimum the axial vibrations of the rotor with a relatively simple and cheap embodiment of the device.

Additionally, the fluid or compressed air used as a working medium eliminates dry friction between the supporting surfaces, thus increasing the service life of the device.

In addition, such a design of the device has small dimensions in the axial direction which in some cases makes it possible to decrease the dimensions of the machine that incorporates the present device.

Figure 2:
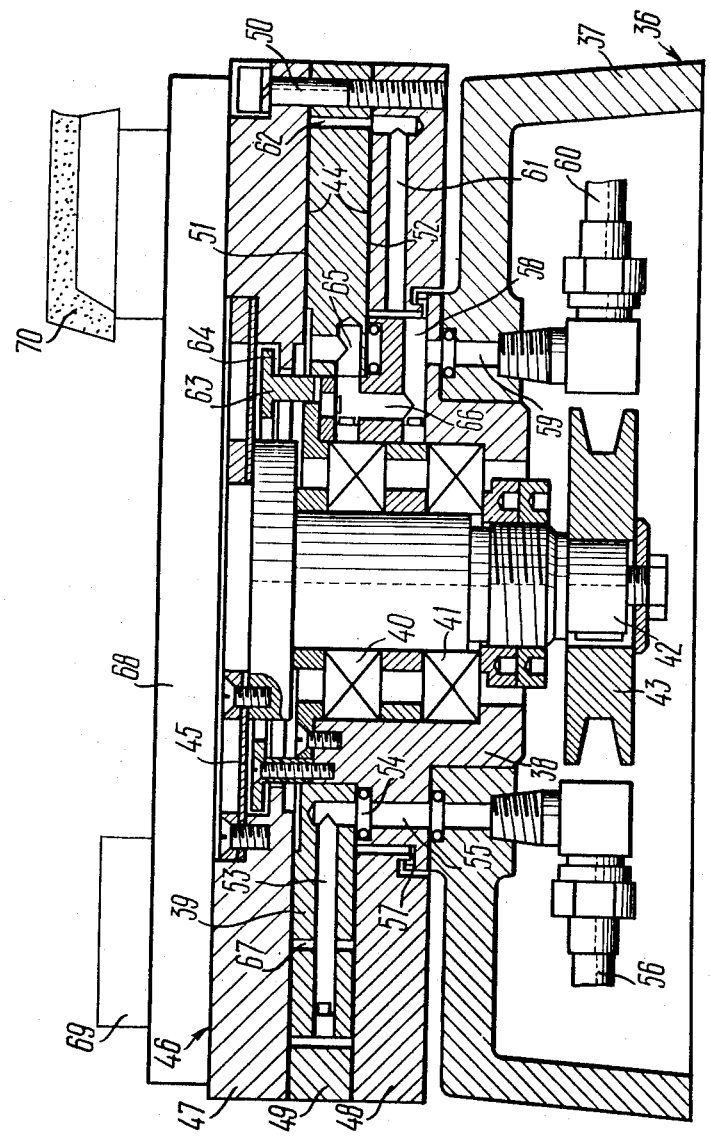

A specific embodiment of the present invention is given below, by way of example, with reference to the accompanying drawings, wherein:

FIG. 1 is a longitudinal cross-sectional view of a device for supporting a workpiece for rotation, according to first embodiment of the invention; and FIG. 2 is a similar view of a second embodiment.

The casing 1 (FIG. 1) of the device includes a post 2 to which a sleeve 4 is connected by means of bolts 3, the sleeve 4 having flanges 5 and 5a attached to it. The flanges 5 and 5a are spaced apart and interconnected by bolts 7 via partition 6, the flange 5 being connected to the sleeve 4 by means of bolts 8. The shaft 11 of a drive (not shown) is installed in the sleeve 4 on bearings 9, 10. Located at the end of the shaft 11 is a pulley 12 which is used to connect the shaft 11 to the drive. The bearings 9, 10 are retained on the shaft 11 from being displaced axially by nuts 13 and intermediate rings 14 and 15.

A rotor 16 is located in the casing 1 between the flanges 5 and 5a. The rotor 16 is constructed in the form of a flat disk whose opposing circular surfaces 17 and 17a serve as its supporting surfaces. These surfaces are arranged perpendicular to the geometrical axis 18 of rotation of the rotor 16.

The surfaces 19 and 19a of the flanges 5 and 5a facing the corresponding supporting surfaces 17 and 17a of the rotor 16 and adjacent to them, are the supporting surfaces of the casing 1 which are held parallel to each other and directed to the opposite sides.

Compressed air used as a working medium is supplied to the space between the surfaces 17 and 19, as well as 17a and 19a. Circular chambers 20 covered with lids 21 are built in the flanges 5 and 5a to supply compressed air to the respective supporting surfaces of the rotor 16 and the casing 1. Each chamber 20 is connected through a channel 22 to an air duct (not shown), and through a plurality of calibrated circumferential openings 23 to the supporting surfaces 19 and 19a facing the supporting surfaces 17 and 17a of the rotor 16. In this way an air gap is formed between the respective surfaces of the rotor 16 and the casing 1 eliminating direct contact between the supporting surfaces, thus considerably reducing the effect produced by inaccurately fabricated supporting surfaces of the rotor 16 and the casing 1 and ensuring a long service life of the device while retaining a high accuracy of operation.

The rotor 16 is connected to the shaft 11 through a member 24 whose stiffness in the axial direction is negligibly small as compared to that of the layer of air which is between the supporting surface of the rotor 16 and the casing 1, thus reducing to a minimum the effect produced by axial vibrations of the drive on the precision of rotation of the rotor 16.

In the given embodiment, a membrane is used as the member 24 to connect the rotor 16 to the shaft 11, the membrane being attached to the rotor 16 through a ring 25, and to the shaft 11 through a ring 26.

Located at the end of the rotor is an appliance 27 used to secure a rotatable (machined) workpiece 28, e.g., a ring of a roller bearing.

In the specific embodiment, instead of this appliance, use can be made of a magnetic cartridge. The cartridge incorporates a permanent magnet 29 and a plate consisting of a ferro-magnetic pole caps 30 and 31 separated by a nonmagnetic layer 32 (bronze babbit). The pole cap 30 is closely adjacent one of the poles of the magnet 29, and the pole cap 31 is connected to the other pole of the magnet 29 through ring 32 and a washer 33 fabricated from a ferromagnetic material.

To hold the workpiece 28 in the radial direction, use is made of a support 34 which is mounted on a bracket 35 fastened to the post 2 of the casing 1. Any suitable supports, both rigid and self-centering, can be used as the radial supports 34.

The second embodiment incorporates a casing 36 (FIG. 2) comprising a post 37, a sleeve 38 and a flange 39 rigidly interconnected. Installed in the sleeve 38 on bearings 40, 41 is a shaft 42 of a drive (not shown) connected to the shaft by means of a pulley 43 fastened to one end of the shaft 42.

The flange 39 is a flat disk whose circular surfaces 44 located on its opposite sides are the supporting surfaces of the casing 36.

The shaft 42 is connected to a rotor 46 through a membrane 45.

The rotor 46 is made in the form of two disks 47 and 48, spaced apart and rigidly interconnected by bolts 50 through a partition 49. The surfaces 51 and 52 of the disks facing each other are the supporting surfaces of the rotor.

The disks 47 and 48 are separated from each other by the partition 49 having the flange 39 inbetween.

The supporting surfaces 51, 52 of the disks 47, 48 are adjacent respective supporting surfaces 44 of the casing 36. Channels 53 are connected, through circular chamber 54 built in the sleeve 38 and through channel 55, to a duct 56 of pressurized fluid supply, the channels 53 being formed in the flange 39 and serving to supply the working medium, for which in this embodiment use is made of pressurized fluid.

Formed in the sleeve 38 and in the disk 48 are circular grooves 57 making up a labyrinth packing which is connected through channels 58 and 59 to a fluid drain duct 60. The area of the said labyrinth packing is connected through a channel 61 to a cavity 62 formed between the flange 39 and the circular partition 49. Fastened to the sleeve 38 is a member 63 which forms together with a circular groove 64 in the disk 47 a labyrinth packing connected through channels 65 and 66 to the channel 58.

From the channel 53 the fluid is supplied under pressure through a plurality of calibrated circumferential openings 67 to the supporting surfaces 44 of the casing 36 and respectively to the adjacent supporting surfaces 51 and 52 of the rotor 46. Thus, a layer of fluid is formed between these supporting surfaces.

An appliance 68 for fastening a workpiece 69 is located on the rotor 46. Used as such an appliance in the described example is a worktable of vertical grinding lathe where the workpiece 69 is to be machined by an abrasive tool 70.

The device operates in the following manner.

The compressed air is supplied through the channels 22, the chamber 20 and the calibrated openings 23 along the supply duct to the space between the supporting surfaces 17 and 19, 17a and 19a respectively of the rotor 16 and the casing 1 creating between them a layer of air.

The workpiece 28 is positioned in the axial direction on the end of the magnetic cartridge 27, and in the radial direction on the supports 34 so that the geometric axis of the workpiece 28 is displaced relative to the geometrical axis 18 of rotation of the rotor 16. Then the drive is actuated to drive shaft 11 which transmits rotation drive through the membrane 24 to the rotor 16. The shaft 11 can rotate in the bearings 9 and 10 which have relatively large radial and axial vibrations. Due to the high stiffness of the layer of air which greatly exceeds the axial stiffness of the membrane 24, the axial vibrations of the shaft 11 of the drive are not transmitted to the rotor 16 and, consequently, to the workpiece 28.

Radial vibrations of the shaft 11 of the drive transmitted through the membrane 24 to the rotor 16 do not substantially affect the accuracy of rotation of the workpiece 28 while using the radial supports 34 against which the rotating workpiece is pressed by the friction forces occurring between the ends of the workpiece 28 and the magnetic cartridge 27 due to the displacement of the axes of the workpiece 28 and the rotor 16.

The compressed air can be supplied to the chambers 20 of the flanges 5 and 5a from self-contained compressed air supply ducts with an independent pressure control. In this case, because of the difference of pressure in the said chambers, it is possible to accomplish a microsupply of the workpiece 28 in the axial direction with respect to the machining tool.

The device according to the second embodiment of the invention operates substantially as described above.

In this embodiment use is made of a fluid as the working medium supplied under pressure from the duct 56 through the channels 55, the chamber 54 and the channel 53 to the calibrated openings 67 to form a layer of fluid between the supporting surfaces 44 and 51 and 44 and 52 respectively of the casing 36 and the rotor 46.

The grooves 57 forming the labyrinth packing are connected to the fluid drain duct 60 through the channels 58, 59, 65 and 66.

We claim:

1. A device for supporting a workpiece for rotation, comprising: a casing; a rotor installed in said casing; said rotor having axially spaced ends with means for securing a workpiece to one of said ends; said rotor having at least two opposite circular supporting surfaces which are flat, parallel and perpendicular to the axis of rotation of said rotor and serve as its supporting surfaces; said casing having at least two circular flat, parallel supporting surfaces arranged adjacent a respective supporting surface of said rotor; means for forming a layer of a working pressure medium between said corresponding supporting surfaces of the said rotor and casing to separate them from one another; drive means for rotating said rotor; and means drivingly connecting said rotor to said drive means while providing radial support for said rotor and including a membrane whose stiffness in the axial direction is negligibly small as compared to the stiffness of said layer of the working medium, thus reducing to a minimum the effect produced by axial vibrations of the drive means for said rotor on the axial accuracy of rotation of the latter, said membrane extending perpendicularly to the axis of rotation of the rotor and being axially disposed between said ends of the rotor.

2. A device as claimed in claim 1 wherein said rotor is constructed as a flat disk whose opposing surfaces serve as the supporting surfaces of the rotor.

3. A device as claimed in claim 1 wherein said rotor is constructed in the form of two spaced and rigidly interconnected disks whose surfaces facing each other are parallel and serve as the supporting surfaces of the rotor.

4. A device as claimed in claim 1 wherein compressed air is used as the working medium.

5. A device as claimed in claim 1 wherein a fluid is used as the working medium.

* * * * *